(12) United States Patent
Yamamoto

(10) Patent No.: US 6,547,294 B2
(45) Date of Patent: Apr. 15, 2003

(54) SHOCK ABSORBING CONSTRUCTION FOR MOTORCYCLES

(75) Inventor: Kazuhiro Yamamoto, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 10/026,783

(22) Filed: Dec. 27, 2001

(65) Prior Publication Data
US 2002/0084658 A1 Jul. 4, 2002

(30) Foreign Application Priority Data
Dec. 27, 2000 (JP) ........................................ 2000-396770

(51) Int. Cl.[7] .............................................. B60R 19/02
(52) U.S. Cl. ........................ 293/105; 293/102; 296/188; 296/189
(58) Field of Search ................................ 293/105, 102; 296/188, 189

(56) References Cited

U.S. PATENT DOCUMENTS

| | | | | |
|---|---|---|---|---|
| 4,311,335 A | * | 1/1982 | Winiecki | 296/188 |
| 4,413,856 A | * | 11/1983 | McMahan et al. | 296/188 |
| 4,427,214 A | * | 1/1984 | Haggkvist | 296/189 |
| 5,462,144 A | * | 10/1995 | Guardiola et al. | 296/189 |
| 5,636,866 A | * | 6/1997 | Suzuki et al. | 296/189 |
| 5,700,545 A | * | 12/1997 | Audi et al. | 188/377 |
| 6,062,632 A | * | 5/2000 | Brachos et al. | 296/188 |
| 6,247,745 B1 | * | 6/2001 | Carroll et al. | 296/189 |

FOREIGN PATENT DOCUMENTS

GB 197809 * 9/1978 ................. 296/105

* cited by examiner

Primary Examiner—D. Glenn Dayoan
Assistant Examiner—Lori L Coletta
(74) Attorney, Agent, or Firm—Birch, Stewart, Kolasch & Birch, LLP

(57) ABSTRACT

A shock absorbing construction for a motorcycle that has a dimensional standard suitable for practical use for sufficiently absorbing an impact. A shock absorbing member includes a plurality of cavities and reinforcing ribs for dividing adjacent cavities. All or some of the reinforcing ribs are formed with thinner portions, respectively. The shock absorbing member projects forwardly from the front wheel is provided so that the shock absorbing member absorbs the impact by being collapsed.

20 Claims, 7 Drawing Sheets

FIG. 3
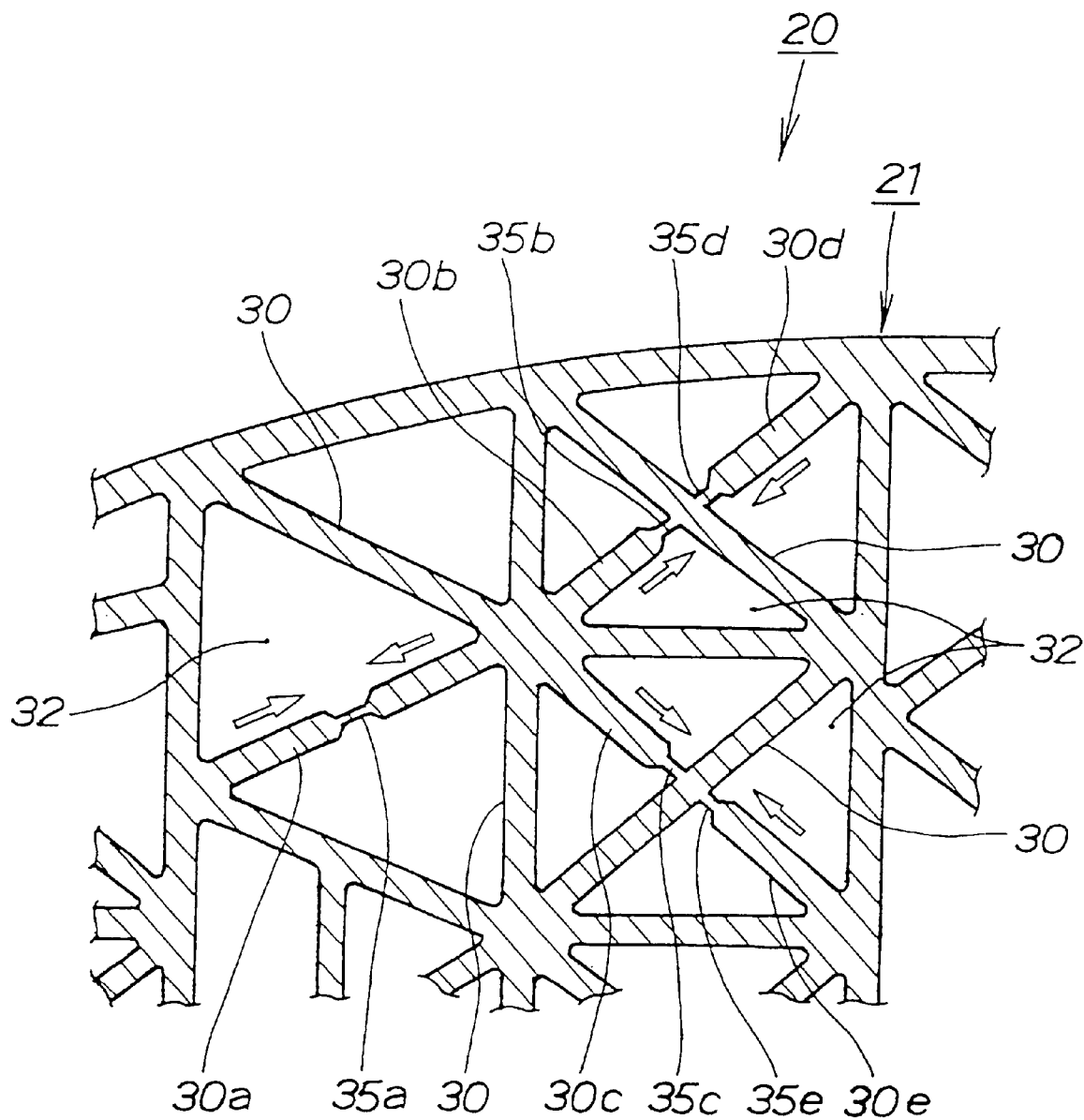
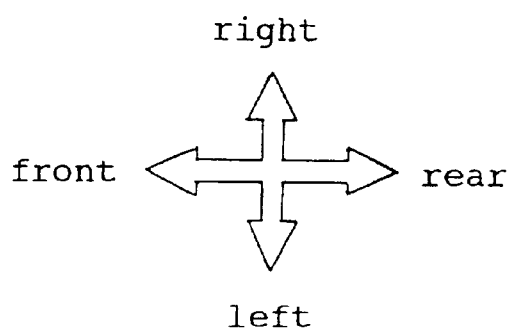

SHOCK ABSORBING CONSTRUCTION FOR MOTORCYCLES

CROSS-REFERENCE TO RELATED APPLICATIONS

The present application claims priority under 35 USC 119 to Japanese Patent Application No. 2000-396770 filed on Dec. 27, 2000 the entire contents thereof is hereby incorporated by reference.

BACKGROUND OF THE INVENTION

1. Field of the Invention

The present invention relates to a shock absorbing construction for motorcycles in which a shock absorbing member projecting from the vehicle body is provided so that the shock absorbing member absorbs the impact by collapsing.

2. Description of Background Art

FIG. 7 is a side view of a shock absorbing construction for a motorcycle according to related art. A shock absorbing member 105 is mounted above a front wheel 104 which is mounted on a fork 103 on the head pipe 102 provided on a vehicle body frame 101 of a motorcycle 100. A deforming element (hereinafter referred to as "shock absorbing member") 105 is mounted at the front end of the vehicle body frame 101.

The shock absorbing member 105 is manufactured by filling foam material 108 in a hollow portion of a frame body 106.

FIGS. 8(a) and 8(b) are explanatory drawings showing the operation of the shock absorbing construction for motorcycles of the related art.

In FIG. 8(a), when a motorcycle 100 (shown in FIG. 7) comes into collision with an obstruction, the tip portion 105a of the shock absorbing member 105 hits the obstruction, and an impact force F1 generated by collision acts on the tip portion 105a as shown by the arrow.

In FIG. 8(b), when an impact force F1 acts on the tip portion 108a of the foam material 108, the tip portion 108a is collapsed. Accordingly, by collapsing the tip portion 105a of the shock absorbing material 105 as much as the amount of collapse L1, an impact force F1 is absorbed to protect the occupant.

Incidentally, when the tip potion 108a of the foam material 108 is collapsed, the space in the foam material 108 is decreased, and thus it resists being collapsed. Therefore, when the foaming space is too small, it is difficult to ensure a sufficient amount of collapse of the shock absorbing member 105, and thus an impact force cannot be absorbed sufficiently.

In order to absorb an impact force sufficiently, it is conceivable to increase the foaming space in the foam material 108 so that the amount of collapse of the foam material 108 is also increased.

However, when the forming space in the foam material 108 is too much, the foam material 108 can be collapsed easily. Therefore, in order to absorb an impact force by means of the foam material 108 with a large amount of foaming space, it is required to increase the size of the foam material 108 to ensure the increased amount of collapse of the foam material 108. As a consequent, the dimensional standard of the shock absorbing member increases too much and thus it is difficult to put it into practical use.

SUMMARY AND OBJECTS OF THE INVENTION

Accordingly, it is an object of the present invention to provide a shock absorbing construction for motorcycles that has a dimensional standard suitable for practical use that can absorb the impact force sufficiently.

In order to achieve the object described above, the present invention provides a shock absorbing construction for motorcycles including a shock absorbing member projecting from the vehicle body that allows the shock absorbing member to absorb an impact force by collapsing. The shock absorbing member includes a plurality of cavities and a reinforcing rib for dividing the adjacent cavities. All or some of the reinforcing ribs are formed with a thinner portion.

By forming a thinner portion on all or some of the reinforcing ribs, the strength of the reinforcing ribs can be controlled. Therefore, the strength of the shock absorbing member can be adequately adjusted for the impact force.

In addition, providing a plurality of cavities helps to accommodate the reinforcing ribs in these cavities when the shock absorbing member is collapsed. Therefore, a sufficient amount of collapse of the shock absorbing member is ensured.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIG. 3 is an enlarged view showing the portion 3 in FIG. 2;

DETAILED DESCRIPTION OF THE PREFERRED EMBODIMENTS

Figure 1:
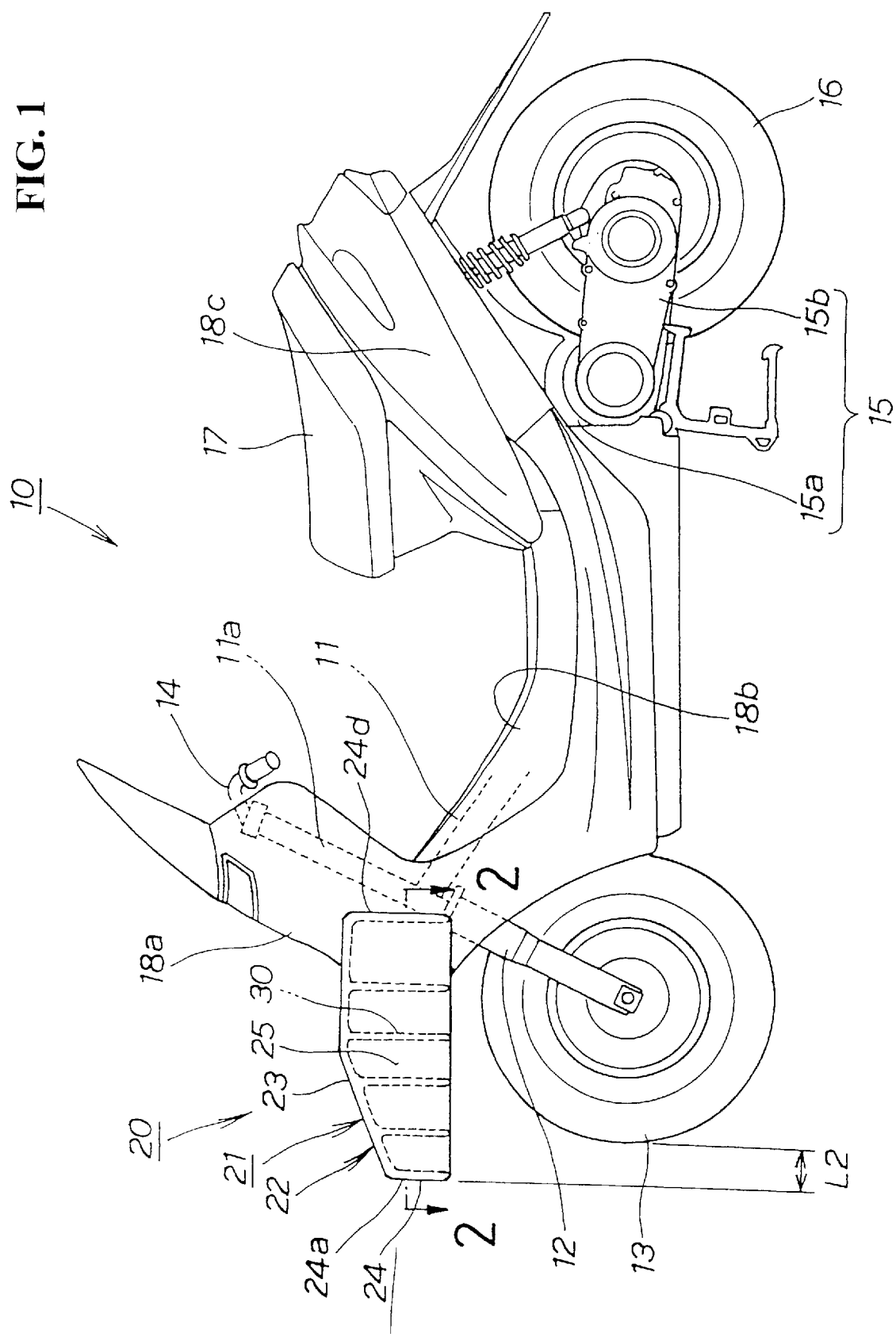
FIG. 1 is a side view of a motorcycle comprising a shock absorbing construction according to the present invention.

Referring now to the attached drawings, an embodiment of the present invention will be described. FIG. 1 is a side view of a motorcycle mainly including a shock absorbing construction according to the present invention.

The motorcycle 10 is a scooter type vehicle including a vehicle body frame 11 with a front fork 12 mounted on a head pipe 11a of the vehicle body frame 1. A front wheel 13 is mounted on the front fork 12. A steering handle 14 is connected to the front fork 12. A swing unit 15 (an engine 15a, a transmission mechanism 15b) is mounted at the rear portion of the vehicle body frame 11. A rear wheel 16 is mounted on the rear portion of the swing unit 15. A seat 17 is disposed at the rear top of the vehicle body frame 11. A front cover 18a is provided for covering the front portion of the head pipe 11a. A center cover 18b extends rearwardly from the front cover 18a for covering the center of the vehicle body frame 11. A side cover 18c extends rearwardly from the center cover 18b for covering the rear portion of the vehicle body frame 11. A shock absorbing structure 20, according to the present invention, is provided on the front cover 18a.

The shock absorbing construction 20 includes a frame body 22 of a shock absorbing member 21 mounted on the front cover 18a by means of, for example, tightening means (not shown), and a plurality of reinforcing ribs 30 . . . provided in a space 25 in the frame body 22.

The frame body 22 includes a ceiling wall 23 bent generally at the center into an inverted V-shape. A peripheral wall 24 is provided around the periphery of the ceiling wall 23. A rear portion 24d of the peripheral wall 24 is mounted to the front cover 18a.

It is also applicable to mount the frame body 22 to the front cover 18a and to the vehicle body frame 11, whereby the shock absorbing member 21 can be mounted on the vehicle body more firmly.

The shock absorbing member 21 is a resin member projecting frontwardly from the vehicle body, or from the front wheel 13, by the distance L2. In this arrangement, the shock absorbing member 21 can absorb the impact by collapsing when the motorcycle 10 collides with an obstruction.

As described above, the occupant is protected from the impact by the shock absorbing member 21, which absorbs an impact by collapsing.

Figure 2:
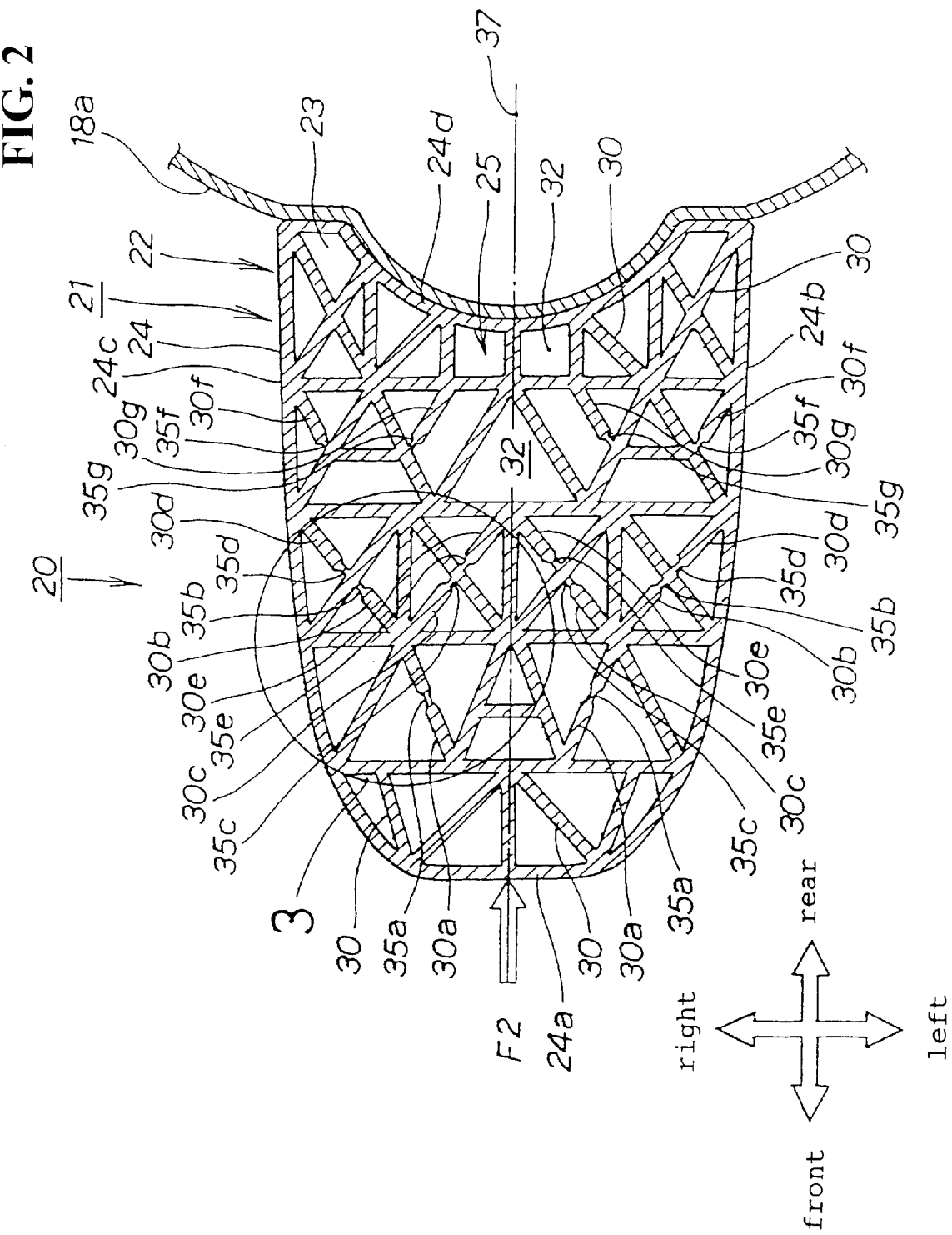
FIG. 2 is a cross-sectional view taken along the line 2—2 in FIG. 1.

FIG. 2 is a cross-sectional view taken along the line 2—2 in FIG. 1.

The peripheral wall 24 of the frame body 22 is a wall portion formed generally in a U-shape in cross section. A front wall 24a extends linearly in the direction of the width along the front end of the ceiling wall 23 (See also FIG. 1). A left side wall 24b extends rearwardly from the left end of the front wall 24a and is curved in a front end portion thereof. A right side wall 24c extends rearwardly from the right end of the front wall 24a and is curved in a front end portion thereof. The rear wall 24d connects the rear ends of the left and right side walls 24b and 24c and is curved to correspond to the configuration of the front cover 18a.

Providing the peripheral wall 24 around the ceiling wall 23 in this way defines the space 25 in the frame body 22.

The shock absorbing member 21 is a construction in which a plurality of reinforcing ribs 30 . . . are provided in the space 25 of the above-described frame body 22. The reinforcing ribs 30 . . . divide the interior of the frame body 22 into a plurality of cavities 32 . . . . Some of the reinforcing ribs 30a–30g out of the group of reinforcing ribs 30 . . . are formed respectively with thinner portions 35a–35g.

Arranging the plurality of reinforcing ribs 30 . . . so that the cavities 32 . . . are formed into generally triangular shape as shown in FIG. 2 helps the frame body 22 to have a desired strength.

The positions to arrange the reinforcing ribs 30 . . . are not limited to the positions shown in FIG. 2, and they may be changed arbitrary according to the strength required for the shock absorbing member 21.

The thinner portions 35a–35g are formed, for example, by the steps of selecting suitable reinforcing ribs 30a–30g out of the reinforcing ribs 30 . . . that are subjected to a compressive load, and then forming the thinner portion 35a–35g on the selected reinforcing ribs 30a–30g respectively.

In other words, the reinforcing ribs 30a–30g are provided on the right side and the left side of the shock absorbing member 21 so as to be symmetric with respect to a axle 37, and the thinner portions 35a–35g are provided on the left and right reinforcing ribs 30a–30g.

According to the shock absorbing member 21, when an impact force F2 acts on the front wall 24a as shown by an outline arrow, a compressive force acts in the direction of the axis of the reinforcing ribs 30a–30g on the right side, and a compressive force acts in the direction of the axis of the reinforcing ribs 30a–30g on the left side.

Since the construction of the reinforcing ribs 30a–30g on the right side and of the reinforcing ribs 30a–30g on the left side are the same, only the reinforcing ribs 30a–30g on the right side are described and the description of the reinforcing ribs 30a–30g on the left side is omitted.

FIG. 3 is an enlarged view of the portion 3 in FIG. 2 showing a state in which the thinner portion 35a is formed at the center of the reinforcing rib 30a. The thinner portion 35b is formed at the rear end of the reinforcing rib 30b which is the portion to be joined to the reinforcing rib 30. The thinner portion 35c is formed at the front end of the reinforcing rib 30c which is the portion to be joined to the reinforcing rib 30. The thinner portion 35d is formed at the rear end of the reinforcing rib 30d which is the portion to be joined to the reinforcing rib 30. The thinner portion 35e is formed at the front end of the reinforcing rib 30e which is the portion to be joined to the reinforcing rib 30.

When the impact force F2 acts on the front wall 24a (shown in FIG. 2) of the shock absorbing member 21, the compressive force acts on these reinforcing ribs 30a–30g in the axial direction as shown by the arrows. Therefore, by forming the thinner portions 35a–35g on the reinforcing ribs 30a–30g, the thinner portions 35a–35g may be broken or deformed effectively.

The operation of the shock absorbing construction 20 according to the present invention as described above will now be described.

Figure 4A:
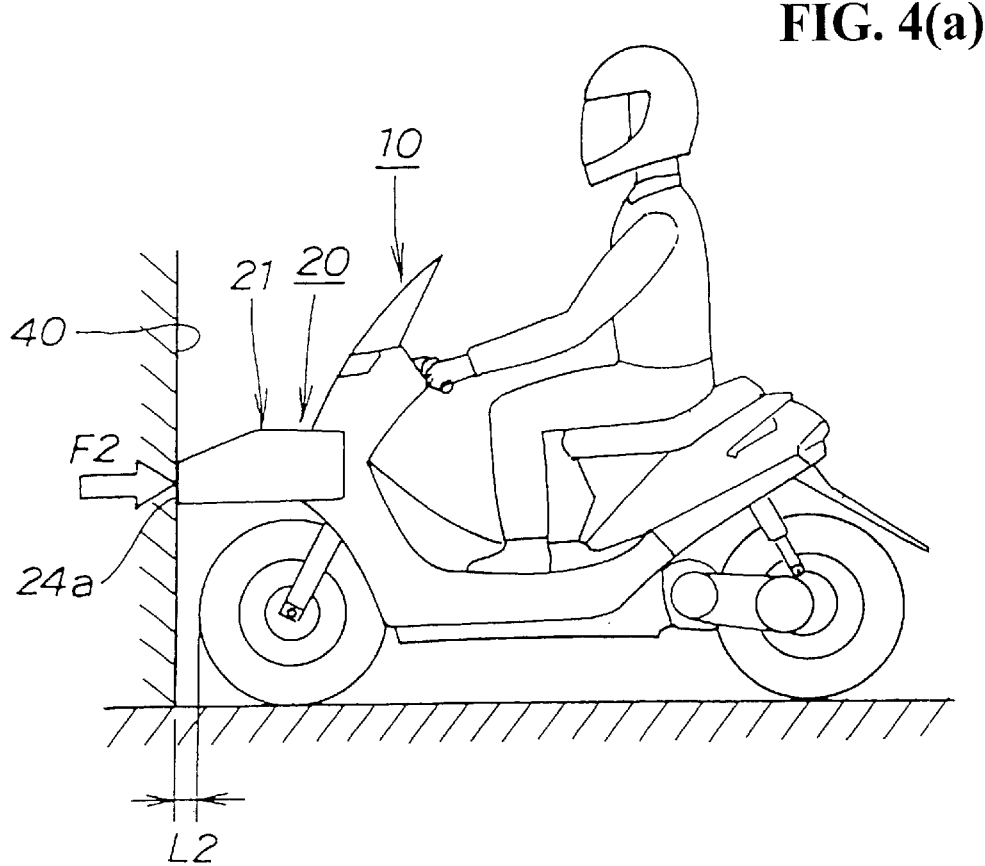
FIGS. 4(a) and 4(b) are explanatory drawings showing the first operation of the shock absorbing construction for motorcycles according to the present invention.
Figure 4B:
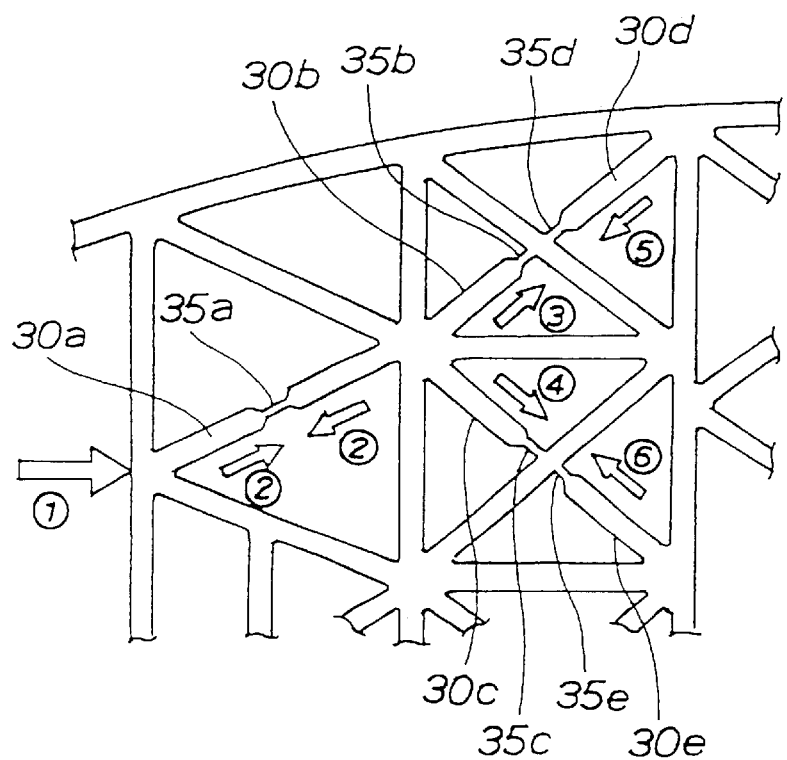

FIGS. 4(a) and 4(b) are explanatory drawings showing the first operation of the shock absorbing construction for a motorcycle according to the present invention.

In FIG. 4(a), the front end 24a of the shock absorbing member 21 collides with an obstruction 40 during the operation of the motorcycle 10. As a consequent, an impact force $F_2$ acts on the front end 24a of the shock absorbing member 21.

In FIG. 4(b), an impact force F2 acts on the tip of the reinforcing rib 30a as shown by the arrow (1), and a compressive force acts on the reinforcing rib 30a as shown by the arrow (2). Then, a compressive force acts on the reinforcing rib 30b as shown by the arrow (3), and a compressive force acts on the reinforcing rib 30c as shown by the arrow (4). Concurrently, a compressive force acts on the reinforcing rib 30d as shown by the arrow (5), and a compressive force acts on the reinforcing rib 30e as shown by the arrow (6).

Figure 5A:
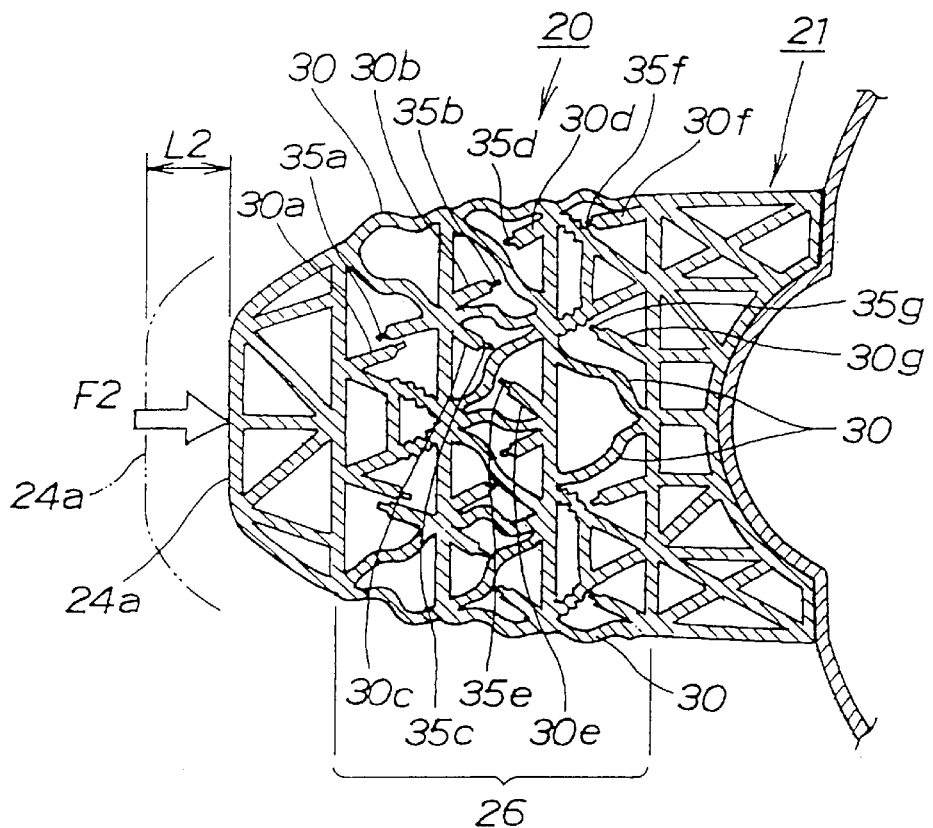
FIGS. 5(a) and FIG. 5(b) are explanatory drawings showing the second operation of the shock absorbing construction for a motorcycle according to the present invention.
Figure 5B:
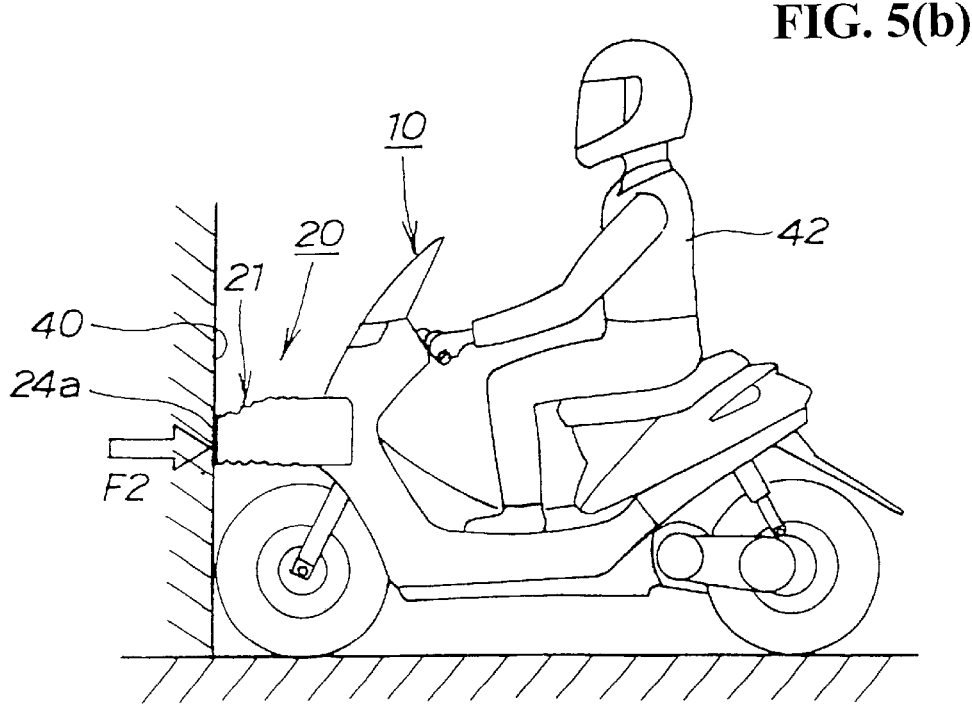

FIGS. 5(a) and 5(b) are explanatory drawings showing the second operation of the shock absorbing construction for a motorcycle according to the present invention.

In FIG. 5(a), on the right side, the thinner portion 35a of the reinforcing rib 30a, the thinner portion 35b of the reinforcing rib 30b, the thinner portion 35c of the reinforcing rib 30c, the thinner portion 35d of the reinforcing rib 30d, the thinner portion 35e of the reinforcing rib 30e, the thinner portion 35f of the reinforcing rib 30f, and the thinner portion 35g of the reinforcing rib 30g are broken.

Concurrently, the respective thinner portions 35a–35g of the reinforcing ribs 30a–30g on the left side are also broken as in the case of the right side.

Breakage of the respective thinner portions 35a–35g removes the support by the reinforcing ribs 30a–30g. Therefore, the load can be concentrated on the other reinforcing ribs 30 . . . , and thus other reinforcing ribs 30 . . . may be collapsed to the state shown in the FIG. 5(a).

Since the thinner portions 35a–35g are provided generally over the whole area of a central portion 26 of the shock absorbing member 21, the whole area of the central portion 26 of the shock absorbing member 21 can be collapsed effectively, thereby ensuring a large amount of collapse L2 of the shock absorbing member 21.

In FIG. 5(b), the increased amount of collapse L2 (shown in FIG. 5(a)) of the shock absorbing member 21 contributes to absorb an impact force F2 to a sufficient extent when the front end 24a of the shock absorbing member 21 collides with the obstruction 40. Thus, an occupant 42 may be protected from the impact force F2.

As described above, the shock absorbing member 21 includes the plurality of cavities 32 . . . , with the reinforcing ribs 30 . . . for dividing the adjacent cavities 32, 32, and the thinner portions 35a–35g that are formed on some of the reinforcing ribs 30a–30g out of these reinforcing ribs 30 . . .

The thinner portions 35a–35g formed on the reinforcing ribs 30a–30g can adjust the strength of the reinforcing ribs 30a–30g. Therefore, the strength of the shock absorbing member 21, or the extent of collapse can be suitably adjusted according to the impact force.

In addition, the provision of the plurality of cavities 32 . . . contributes to ensure a sufficient amount of collapse L2 of the shock absorbing member 21.

Since the extent of collapse of the shock absorbing member 21 can be adjusted to ensure the amount of collapse L2 as is described thus far, the shock absorbing member 21 can be formed in dimensions that are suitable for practical use, and simultaneously, the impact force can be absorbed sufficiently.

Figure 6:
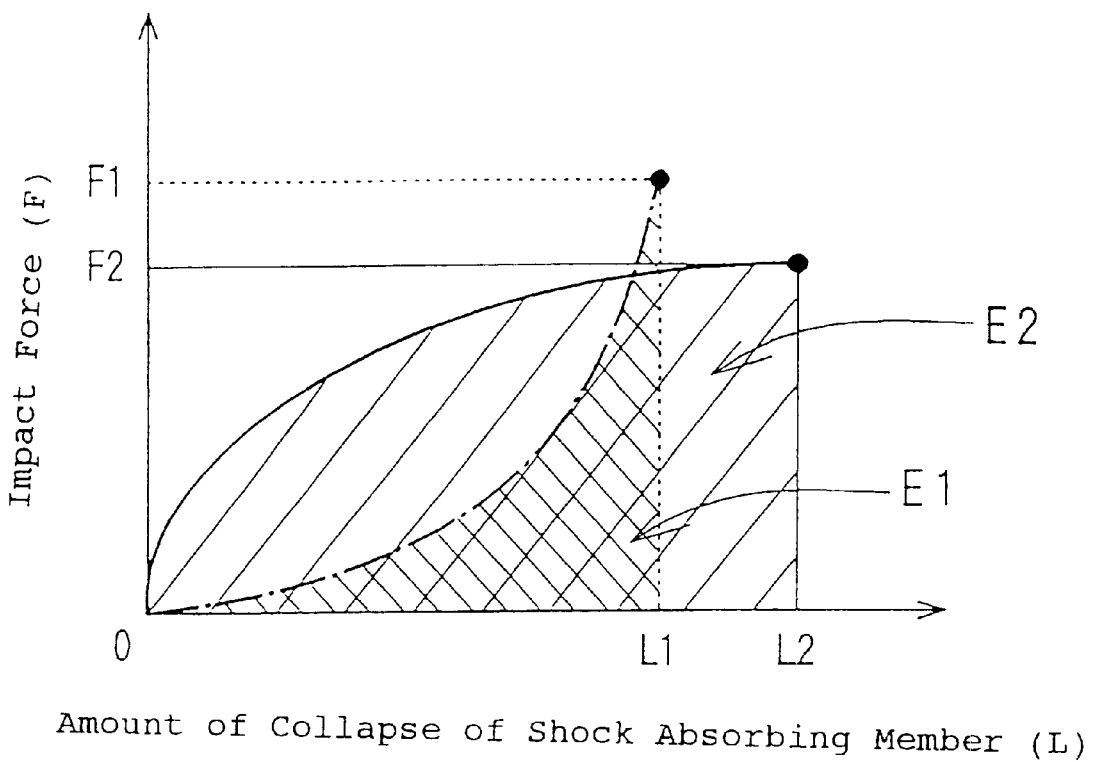
FIG. 6 is a graph representing a relation between an impact force and the amount of collapse in the shock absorbing construction according to the present invention.
Figure 7:
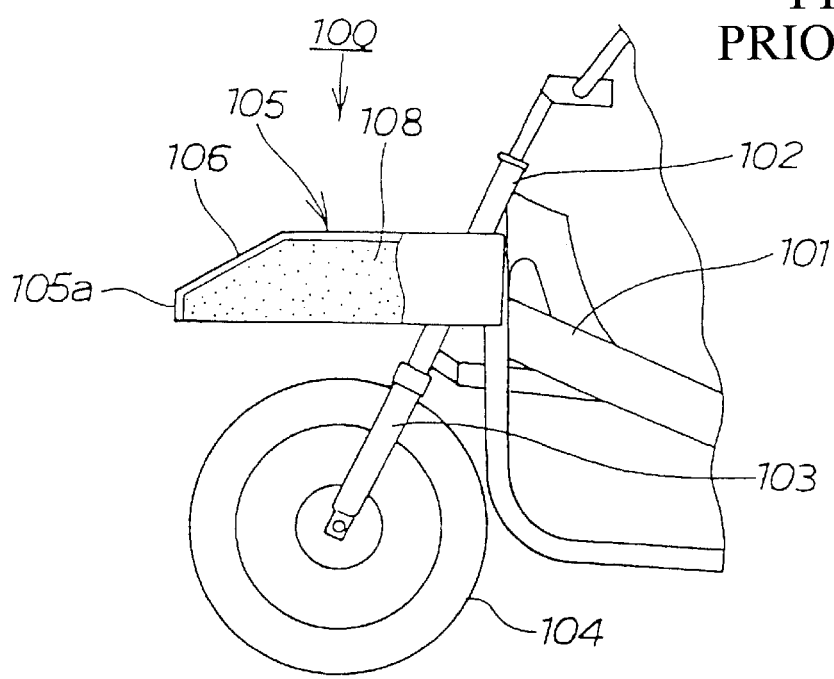
FIG. 7 is a side view of the shock absorbing construction for motorcycles of the related art.
Figure 8A:
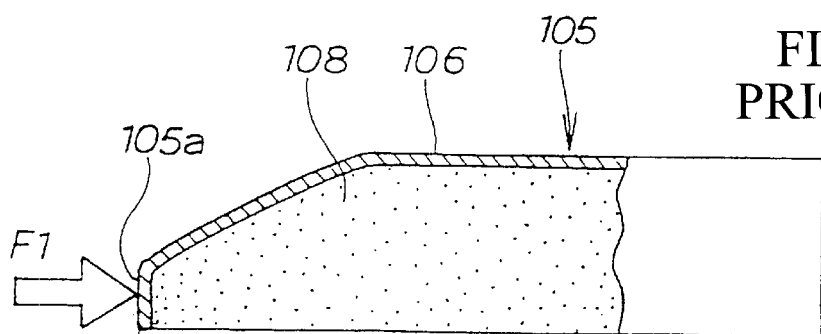
FIGS. 8(a) and 8(b) are explanatory drawings showing the operation of the shock absorbing construction for motorcycles of the related art.
Figure 8B:
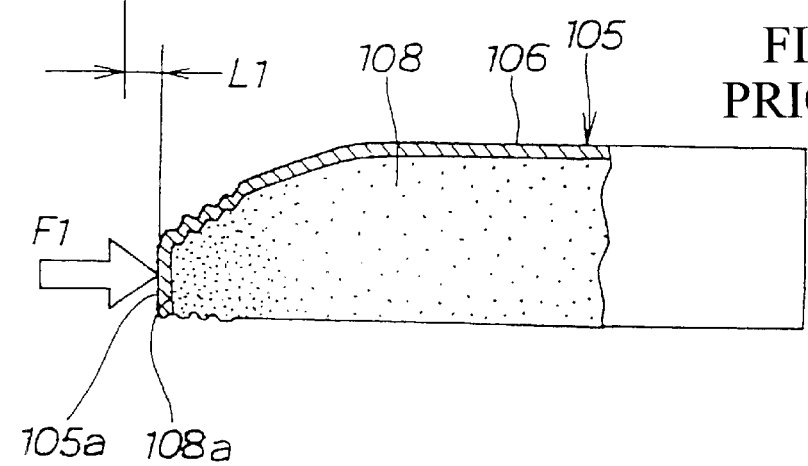

FIG. 6 is a graph showing a relation between an impact force and the amount of collapse in the shock absorbing construction according to the present invention.

The graph representing the case where a shock absorbing member according to the related art is collapsed in a dashed line is shown as a "comparative example," and the graph representing the case where a shock absorbing member according to the present invention is collapsed in a solid line is shown as an "embodiment." The vertical axis represents an impact force (F), and the lateral axis represents the amount of collapse (L) of the shock absorbing member.

The comparative example shows that the amount of collapse of the shock absorbing member is as small as L1, and the graph in a dashed line represents a concave curve. Therefore, the amount of impact energy that can be absorbed is small in the area E1 surrounded by 0-F1-L1, where it is difficult to protect the occupant sufficiently from the impact force.

The reason why the graph in a dashed line represents a concave curve here is that the shock absorbing member (foam material) in the comparative example can be collapsed by a relatively small impact force.

In the embodiment, the amount of collapse of the shock absorbing member is as large as L2, and the graph in a solid line represents a convex curve. Therefore, the amount of impact energy that can be absorbed is large in the area E2 surrounded by 0-F2-L2, where the occupants can be protected sufficiently from the impact force.

The reason why the graph in a solid line represents a convex curve here is that the shock absorbing member in the embodiment is collapsed by a suitable impact force.

In the embodiment described above, the case where some of the reinforcing ribs 30a–30g out of the reinforcing ribs 30 . . . are formed with thinner portions 35a–35g respectively is described. However, it is not limited thereto, and is also applicable to form a thinner portion for all the reinforcing ribs 30 . . . The locations for forming the thinner portions 35a–35g may be determined as appropriate.

Though an example in which the shock absorbing member 21 is formed of resin is described in the embodiment described above, it is also possible to form it of other materials, such as aluminum alloy, steel, or the like.

In the embodiment described above, an example in which the shock absorbing member 21 is attached at the front end of the vehicle body is shown. However, the same effect can be achieved even when the shock absorbing member 21 is mounted at the rear end or at the left and right sides of the vehicle body.

The present invention in the arrangement described above provides the following advantages.

The shock absorbing member according to the present invention is provided with a plurality of cavities and reinforcing ribs for dividing the adjacent cavities, and all or some of the reinforcing ribs are formed with thinner portions.

Provision of thinner portions for all or some of the reinforcing ribs enables adjustment of the strength of the reinforcing rib. Therefore, the strength of the shock absorbing member can be suitably adjusted according to the impact force.

In addition, the provision of a plurality of cavities enables accommodation of the reinforcing ribs in these cavities when the shock absorbing member is collapsed. Therefore, a sufficient amount of collapse of the shock absorbing member is ensured.

As is described thus far, since the extent of collapse of the shock absorbing member can be adjusted to establish the amount of collapse, the dimensions of the shock absorbing member can be selected to be suitable for practical use, and simultaneously, an impact force can be absorbed sufficiently.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A shock absorbing construction for a motorcycle comprising:

a shock absorbing member projecting from a vehicle body, said shock absorbing member being formed with a ceiling wall and a peripheral wall and being capable of absorbing an impact force by collapsing;

a plurality of cavities formed in said shock absorbing member; and reinforcing ribs extending downwardly from said ceiling member for dividing adjacent cavities, wherein all or some of the reinforcing ribs are formed with a thinner portion.

2. The shock absorbing construction for a motorcycle according to claim 1, wherein each of said plurality of cavities is individually formed in the shape of a triangle for increasing the strength of the shock absorbing member.

3. The shock absorbing construction for a motorcycle according to claim 2, wherein said reinforcing ribs form dividing wall portions of each of said triangles.

4. The shock absorbing construction for a motorcycle according to claim 3, wherein selective reinforcing ribs forming a selected triangle include the thinner portions for adjusting the strength of the shock absorbing member.

5. The shock absorbing construction for a motorcycle according to claim 1, wherein said shock absorbing member is substantially U-shaped in cross section with side walls that are curved from a rear portion towards a front portion of said shock absorbing member.

6. The shock absorbing construction for a motorcycle according to claim 1, wherein when an impact force is applied to said shock absorbing member, all or some of said reinforcing ribs formed with said thinner portion which collapses while for absorbing the force.

7. The shock absorbing construction for a motorcycle according to claim 1, wherein a plurality of groups of cavities are arranged from a front portion of said shock absorbing member to a rear portion for permitting selective collapse of groups of cavities as an impact force is applied.

8. The shock absorbing construction for a motorcycle according to claim 1, wherein said shock absorbing member is formed of resin.

9. The shock absorbing construction for a motorcycle according to claim 1, wherein said shock absorbing member is formed of steel.

10. The shock absorbing construction for a motorcycle according to claim 1, wherein said shock absorbing member is formed of aluminum.

11. A shock absorber comprising:

a frame body formed with a ceiling wall and a peripheral wall;

a plurality of cavities formed in said frame body; and reinforcing ribs extending downwardly from said ceiling wall for dividing adjacent cavities;

said shock absorber absorbing an impact force by collapsing selective cavities in proportion to the force applied.

12. The shock absorber according to claim 11, wherein each of said plurality of cavities is individually formed in the shape of a triangle for increasing the strength of the shock absorbing member.

13. The shock absorber according to claim 12, wherein said reinforcing ribs form dividing wall portions of each of said triangles.

14. The shock absorber according to claim 13, wherein selective reinforcing ribs forming a selected triangle include thinner portions for adjusting the strength of the shock absorbing member.

15. The shock absorber according to claim 11, wherein said shock absorbing member is substantially U-shaped in cross section with side walls that are curved from a rear portion towards a front portion of said shock absorbing member.

16. The shock absorber according to claim 11, wherein when an impact force is applied to said shock absorbing member, all or some of said reinforcing ribs are formed with a thinner portion which collapses while absorbing the force.

17. The shock absorber according to claim 11, wherein a plurality of groups of cavities are arranged from a front portion of said shock absorbing member to a rear portion for permitting selective collapse of groups of cavities as an impact force is applied.

18. The shock absorber according to claim 11, wherein said shock absorbing member is formed of resin.

19. The shock absorber according to claim 1, wherein said shock absorbing member is formed of steel.

20. The shock absorber according to claim 11, wherein said shock absorbing member is formed of aluminum.

* * * * *